(12) United States Patent
Virtanen (10) Patent No.: US 9,764,957 B2
(45) Date of Patent: Sep. 19, 2017

(54) FUNCTIONALIZED GRAPHITIC MATERIALS

(71) Applicant: TESLA NANOCOATINGS, INC., Massillon, OH (US)

(72) Inventor: Jorma Virtanen, Las Vegas, NV (US)

(73) Assignee: TESLA NANOCOATINGS, INC., Massillon, OH (US)

( * ) Notice: Subject to any disclaimer, the term of this patent is extended or adjusted under 35 U.S.C. 154(b) by 0 days.

(21) Appl. No.: 14/768,406

(22) PCT Filed: Apr. 30, 2013

(86) PCT No.: PCT/US2013/038829
§ 371 (c)(1),
(2) Date: Aug. 17, 2015

(87) PCT Pub. No.: WO2014/130069
PCT Pub. Date: Aug. 28, 2014

(65) Prior Publication Data
US 2016/0002047 A1    Jan. 7, 2016

(51) Int. Cl.
*C01B 31/04* (2006.01)
*C01B 31/02* (2006.01)
*B82Y 30/00* (2011.01)
*B82Y 40/00* (2011.01)

(52) U.S. Cl.
CPC .......... *C01B 31/0484* (2013.01); *B82Y 30/00* (2013.01); *B82Y 40/00* (2013.01); *C01B 31/028* (2013.01); *C01B 31/0273* (2013.01)

(58) Field of Classification Search
CPC ............ C01B 31/0273; C01B 31/0484; C01B 31/028; B82Y 30/00; B82Y 40/00
See application file for complete search history.

(56) References Cited

U.S. PATENT DOCUMENTS

| 9,243,146 B2 | 1/2016 | Virtanen et al. |
| 2009/0318717 A1* | 12/2009 | Virtanen ............... C07D 303/18 549/512 |

FOREIGN PATENT DOCUMENTS

CN    102 372 811    1/2013

OTHER PUBLICATIONS

Funck, Andreas, and Walter Kaminsky. "Polypropylene carbon nanotube composites by in situ polymerization." Composites Science and Technology 67.5 (2007): 906-915.*
Zhu, Jiang, et al. "Improving the dispersion and integration of single-walled carbon nanotubes in epoxy composites through functionalization." Nano letters 3.8 (2003): 1107-1113.*

(Continued)

*Primary Examiner* — Richard M Rump
(74) *Attorney, Agent, or Firm* — Emerson Thomson Bennett LLC; Daniel A. Thomson (57) ABSTRACT

One or more techniques are disclosed for a method of functionalizing graphitic material, comprising the steps of: 1) providing a graphitic material; 2) cutting the graphitic material; 3) providing a catalyst comprising at least one catalyst of a metal atom, metal cation, metal alcoholates, metal alkanoates, metal sulfonates, and metal powder; 4) providing a reagent; 5) binding the catalyst to the reagent; 6) binding the reagent to the graphitic material; and 7) recovering the catalyst. Also disclosed is a composition prepared from the methods described herein.

16 Claims, 4 Drawing Sheets

(56) References Cited

OTHER PUBLICATIONS

Hu, Junping, et al. "Efficient method to functionalize carbon nanotubes with thiol groups and fabricate gold nanocomposites." Chemical physics letters 401.4 (2005): 352-356.*

Chatterjee, Sanjukta, et al. "Mechanical reinforcement and thermal conductivity in expanded graphene nanoplatelets reinforced epoxy composites." Chemical Physics Letters 531 (2012): 6-10.*

Sullivan, James A., Keith A. Flanagan, and Holger Hain. "Suzuki coupling activity of an aqueous phase Pd nanoparticle dispersion and a carbon nanotube/Pd nanoparticle composite." Catalysis Today 145.1 (2009): 108-113.*

Su-Dong, Yang, et al. "Highly dispersed Pd nanoparticles on chemically modified graphene with aminophenyl groups for formic acid oxidation." Chinese Physics B 20.11 (2011): 113301.*

Funck, A., Kaminsky, W., "Polypropylene Carbon Nanotube Composites by in situ Polymerization," Composites Science and Technology, Elsevier, UK, vol. 67, No. 5, pp. 906-915, Jan. 18, 2007.

Gergely, A., Telegdi, J., Meszaros, E., Paszti, Z., Tarkanyi, G., Harman, F.H., Kalman, E., "Modification of Multi-Walled Carbon Nanotubes by Diels-Alder and Sandmeyer Reactions," Journal of Nanoscience and Nanotechnology, American Scientific Publishers, US, vol. 7, No. 8, pp. 2795-2807, Aug. 7(8), 2007.

Nabarun, R., Sengupta, R., Bhowmick, A.K., "Modifications of Carbon for Polymer Composites and Nanocomposites," Progress in Polymer Science, Pergamon Press, Oxford, GB, vol. 37, No. 6, pp. 781-819, Dec. 30, 2011.

European Patent Office, "International Search Report," PCT/US2013/038829, Feb. 18, 2014.

Nayak, R.R., Shanmugharaj, A.M., Ryu, S.H., "A Novel Route for Polystyrene Grafted Single-Walled Carbon Nanotubes and their Characterization" Macromol. Chem. Phys. 2008, 209, 1137-1144.

* cited by examiner

FUNCTIONALIZED GRAPHITIC MATERIALS

This application claims priority to PCT/US2013/038829, filed Apr. 30, 2013, and U.S. Ser. No. 61/850,562, entitled Accelerated Fabrication of Hybride Materials, filed Feb. 20, 2013, which is incorporated herein by reference.

BACKGROUND

Carbon nanotubes (CNTs) and graphene have been used to reinforce thermoset plastics like epoxies, polyurethanes, and silicones. CNTs, functionalized CNTs (or hybrid CNTs, denoted HNTs), carbon fiber, graphite, graphene, and functionalized graphene may collectively be referred to as graphitic materials. Graphitic materials may have a high tensile strength. Composites and other hybrid materials can be fabricated by incorporating graphitic materials into various matrix materials in order to improve tensile strength and other properties. For example, these graphitic materials can be incorporated into any of the epoxy components such as the epoxy resin and hardener. Graphitic materials may also be incorporated into polyurethanes and silicones. Such graphitic materials may interact with the matrix materials and each other through van der Waals forces.

However, the mechanical properties and the chemical properties of the composites may be altered. In order to provide both favorable mechanical and chemical properties of the composites and other hybrid materials, several functionalization methods for the graphitic materials may be used. These methods may include nitric acid/sulfuric acid oxidation of the CNTs, aryl radical addition to the CNTs, ball milling induces addition of amines and sulfides into the CNTs, butyl lithium activated coupling to alkyl halides, and ultrasonic vibration assisted addition of many reagents, including amines and epoxies. These methods may or may not require any solvent or form other side products.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a method of functionalizing graphitic material comprises the steps of: 1) providing a graphitic material; 2) cutting the graphitic material; 3) providing a catalyst comprising at least one catalyst of a metal atom, metal cation, metal alcoholates, metal alkanoates, metal sulfonates, and metal powder; 4) providing a reagent; 5) binding the catalyst to the reagent; 6) binding the reagent to the graphitic material; and 7) recovering the catalyst.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

Described herein is a method of functionalizing graphitic material, comprising the steps of: 1) providing a graphitic material; 2) cutting the graphitic material; 3) providing a catalyst comprising at least one catalyst of a metal atom, metal cation, metal alcoholates, metal alkanoates, metal sulfonates, and metal powder; 4) providing a reagent; 5) binding the catalyst to the reagent; 6) binding the reagent to the graphitic material; and 7) recovering the catalyst. Also described herein is a composition prepared from the methods described herein.

Figure 1:
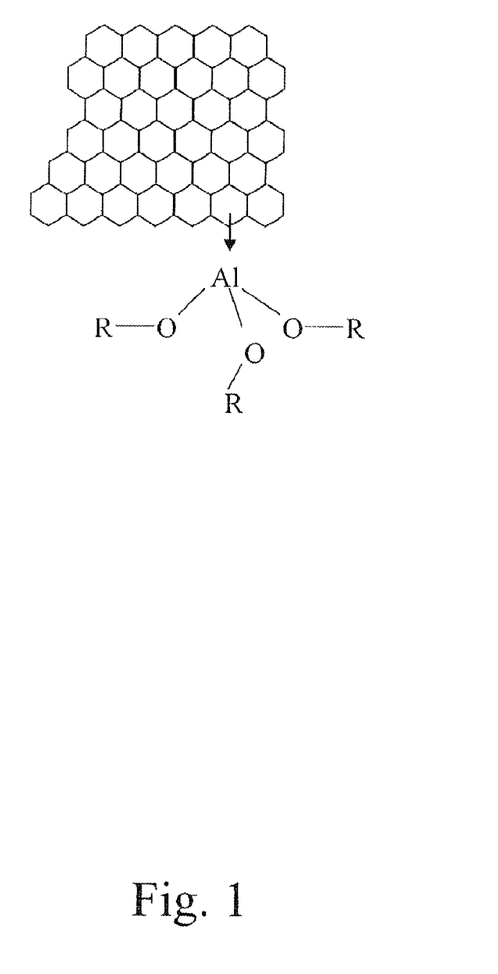
FIG. 1 schematically illustrates what is disclosed herein.

FIG. 1 depicts graphitic material. The graphitic material may include carbon nanotubes (CNTs) and graphene. FIG. 1 also provides the functionalization of the graphitic material. The graphitic material can be functionalized by the methods described herein, and further used in the hybrid materials. The methods are further applicable to all graphitic materials.

Within FIG. 1, an aluminum catalyst may be introduced after cutting. Cutting methods can include ultrasonic cutting and mechanical cutting by mill using nanoparticles or microparticles as actual cutting agents. The cutting may be done in the presence of amine hardener that contains aminopropyl trimethoxysilane (also known as APTMS). The milling with nanoparticles may be done such that the nanoparticles cannot bind with carbon nanotubes or graphene. Due to high reactivity of cut carbon nanotubes or grapheme, the binding may still occur even if the nanoparticles do not have any special surface functionalization. To note, the cutting may be done in the absence of oxygen and water.

Additionally, there may be an optimum limit for the cutting induced functionalization. An extending cutting induced reaction may lead to smaller graphitic particles. Smaller graphitic particles may not provide the same mechanical properties as the larger graphitic particles.

Cutting methods of graphitic material may include cutting of one bond or cutting of the whole CNT or other graphitic particle. Cutting methods can include ultrasonic vibration, sonotrodes, mechanical, or shear cutting in the presence of microparticles or nanoparticles, shear force, and electromagnetic radiation.

Ultrasonic vibrators may be made of piezoelectric materials. A piezoelectric material may be lead zirconium titanate. The piezoelectric material can be sandwiched between two electrodes. The frequency and amplitude of the ultrasonic vibration can be adjusted the electric potential and frequency of the AC field between the electrodes. The amplitude of the vibration may be limited by the thickness of the piezoelectric layer. The frequencies may vary between about 10 kHz and about 1 MHz, although frequencies outside these ranges can be used. The frequencies may also be between about 20 kHz and about 30 kHz. The vibration amplitude may be between about 5 micrometers and about 200 micrometers. The vibration amplitude may also be between about 20 micrometers and about 120 micrometers.

The power of one sonotrode can be between about 0.1 kW and about 50 kW. The power of one sonotrode may also be between about 1 kW and about 20 kW. When multiple sonotrodes may be used, the power may vary with time so that interference pattern may continuously change. Thus, the whole reaction mixture can be more evenly agitated.

Conventional sonotrodes can exert a force into a relatively small volume, especially if the medium may be highly viscous. The accelerated reaction rate may use a sonotrode that distributes the ultrasonic vibration into a large volume.

Mechanical cutting can include a multitude of methods that are well known in-the-art of milling and grinding. However, because of crushing of CNTs and other graphitic materials can be harmful for the integrity of these materials, the milling and grinding may be performed in the presence of sharp edged microparticles and nanoparticles in order to get a sharp cut. Suitable particles can include salts, such as sodium chloride, sodium cyanide, calcium oxalate, glass, quartz, and ceramics, such aluminum oxide, and zirconium oxide.

Shear force may also induce the cutting. The use of shear force may require high pressure gradients. Industrial homogenizers can have pressures of several hundred bars or even few thousand bars. The effect of shear force can be amplified by adding microparticles or nanoparticles. The salt can also be a reagent where the addition of crown ethers or phase transfer catalysts like hexadecyl trimethyl ammonium bromide can be used. Implementing shear force may be provided by high pressure microfluidic injection of a reagent mixture through a nozzle, either against a solid wall or injecting two liquid streams directly against each other. This method may be suitable for all kind of graphitic materials, including graphite itself, because graphite will be effectively delaminated producing graphene that will be simultaneously functionalized with the reagents that are present in the reaction mixture. CNTs can be dispersed and reacted using pressures between about 375,000 mmHg (500 bar) to about 2,250,000 mmHg (3000 bar). In order to disperse graphite, pressures may be above about 1,500,000 mmHg (2000 bar).

In another embodiment, ultrasonic vibration may be used to induce the reaction of graphitic material in the presence of metal ion catalyst. The cutting of graphitic materials can also induce a mechanochemical reaction. The cutting may provide radicals within the graphitic material. The cutting may also provide carbanions within the graphitic material. Metals may then be able to bind to the negative carbanion.

The catalyst provided in FIG. 1 may bind to where the graphitic material may be cut. The addition of coordinated metal atom or metal cation catalyst, such as Friedel-Crafts, Sandmayer, Heck, or Suzuki type catalysts in to the reaction mixture, may have wide applicability. Several types of metal atoms or salts can be used as catalysts, including aluminum, iron, tin, zinc, magnesium, copper, palladium, palladium acetate, aluminum isopropoxide, aluminum bromide, aluminum chloride, ferric chloride, nickel acetate, zinc chloride, tin chloride and cuprous chloride. Metal alcoholates may also be beneficial. In some cases, a finely divided metal powder may act similarly to a catalyst because the metal can react with one of the reagents forming a metal ion. For example, aluminum or magnesium powder can react with amines so that the resulting compound may be reactive. Further examples of catalysts may include ferrocene and titanocene.

A catalyst can still promote a reaction, for example, by opening an epoxy ring. A catalyst may also promote reactions in a distance from the cutting site. Reactive sites can move in a conjugated system by a quantum mechanical resonance. At the same time, reactivity of these sites may be attenuated, but a catalyst can compensate the attenuation. Catalysts can form a covalent, ionic, or coordination bond during catalysis, and may stabilize the transient radicals, carbocations, and carbanions.

Traditionally used Friedel-Crafts catalysts, such as aluminum chloride, may be poorly soluble in many solvents, and may interact only weakly with graphitic materials that are themselves poorly dispersed into most solvents. In these cases, metal alkanoates, such as acetates, propionates, palmitates, or benzoates, trifluoromethylsulfinates, or tosylates may be used. Examples may include aluminum tosylate, and zinc trifluoro methylsulfinate. These catalysts can allow bonding of many monomers, including acrylates, bis(isocyanates), silanes, epoxies, such as bisphenol diglycidyl ether and SU-8 with graphitic materials, including carbon nanotubes, and graphene.

Figure 2:
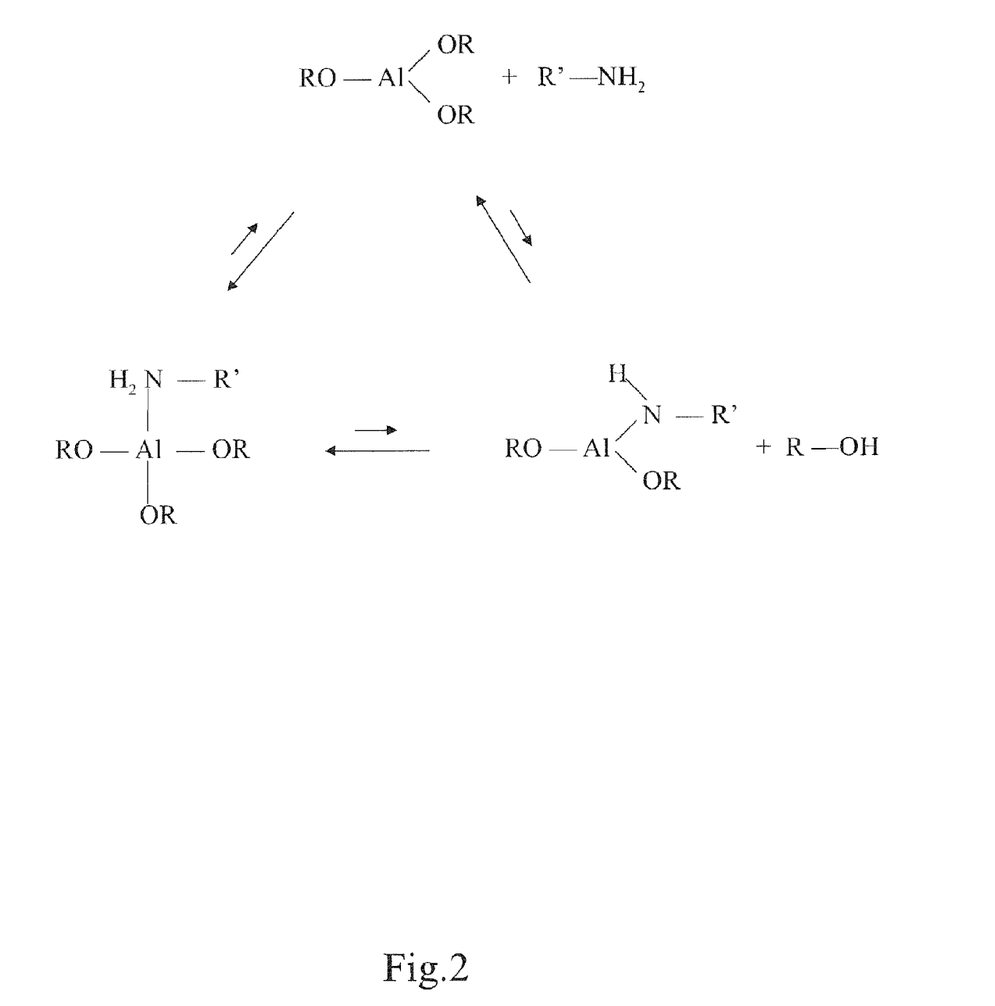
FIG. 2 schematically illustrates what is disclosed herein.

FIG. 2 may provide the stabilization of the catalyst with the reagent. The reagent may comprise at least one reagent of an amino group and an epoxy group. After reacting the catalyst with the reagent, the resulting complex may stabilize in several different forms, as shown in FIG. 2.

Figure 3:
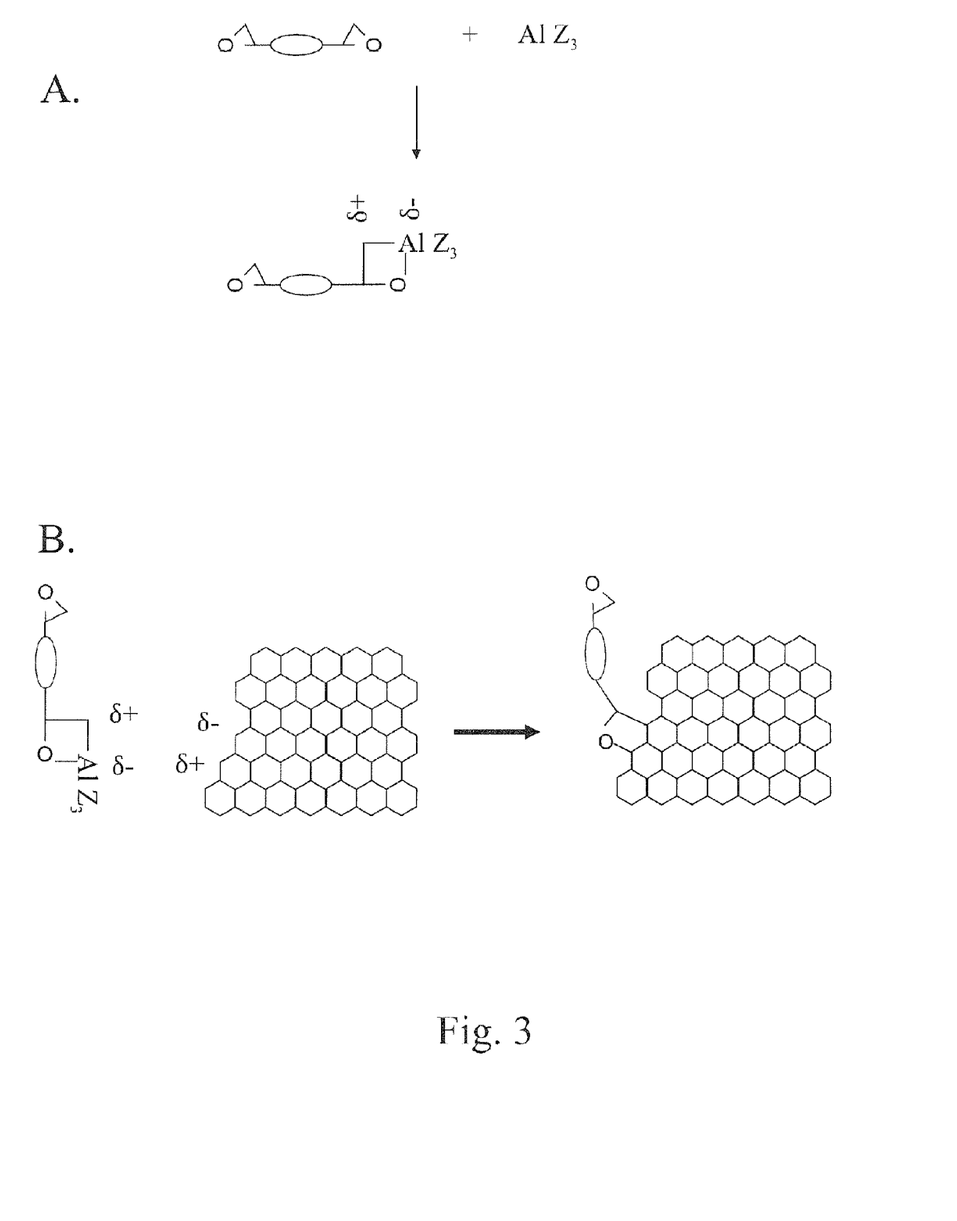
FIG. 3 schematically illustrates what is disclosed herein.

FIG. 3 may provide the reaction in which the reagent like an epoxy can be reacted with a soluble aluminum tosylate in FIG. 3A. The epoxy may bind and may undergo a ring opening. The opened epoxy may now be bound to the graphitic material, as shown in FIG. 3B.

The reagent moieties that can coupled with graphitic material may include, but may not be limited to alkyl and aryl halogenides, tosylates and triflates, acyl halogenides, epoxides, and thiols. Also, diazonium salts can react in the presence of cuprous salts. Cutting may create dangling bonds in the graphitic material. These dangling bonds, which can include radicals, carbocations, and carbanions, may be reactive.

Additionally, any binding may include binding between different molecules. For example, carbon nanotubes may be bound with at least three different molecules during the cutting process: 1) amine hardener, 2) APTMS, and 3) nanoparticles such as silica nanoparticles and alumina nanoparticles. The carbon nanotubes can also be mixed with epoxy that can be used to functionalize the carbon nanotubes so that either hardener or epoxy contains functionalized carbon nanotubes. Also, the epoxy and hardener can both contain functionalized nanotubes and nanoparticles. Additionally, titanium nanoparticles may also bind. The bonding chemistry can be independent of the particle size. Thus, macroparticle and microparticles can be similarly bound.

Within the methods described herein, amines can also be added into graphitic material using aluminum isopropoxide as a catalyst during cutting of graphitic material. The reaction can happen without any catalyst, but often an order of magnitude or more can be obtained in the presence of a catalyst. Alcoholates are basic, and may catalyze self-polymerization of some monomers, including epoxies. Alcoholates, such as aluminum i-propoxide, may originally added to the reaction mixture, and carboxylic, or sulfonic acid may be added at some later stage to neutralize the alcoholate in order to suppress base catalyzed reactions. Other catalysts may also be used, including radical reaction initiators such as dibenzoyl peroxide and bis-t-butyl azide where aluminum catalysts may be used.

The mechanism of these catalysts in the context of methods described herein may not be confirmed. However, without limiting the method herein by a theory, the known mechanisms of the Friedel-Crafts or Sandmayer reactions can be extrapolated into the present case. The catalyst may interact with the reagent, graphitic material, or both. The metal cations containing catalysts may stabilize at least transiently carbon, nitrogen, and sulfur radicals, anions, and cations leading to a reaction path that can have a lower activation energy than the corresponding reaction without the catalyst. Also, the metal cations may prevent the excessive delocalization of the unpaired electrons or charges in graphitic material. This can lead to higher reaction rate. Thus, the catalyst may stabilize the formation of the reactive species from the reagent by slight delocalization of the charge or free electron, and can prevent excessive delocalization of the charge or free electron in the graphitic material. Either or both of these can happen independently, and can lead to an accelerated reaction rate and improved degree of substitution. After the reagent may be bound to the graphitic material, the catalyst used within the methods described herein may be recovered.

The Suzuki reaction within the methods described herein may require an addition of a halogen or halide salt, and trimethyl borate, or some other boric acid ester at least in catalytic amounts. During sonication, halogenides can be formed, and the Suzuki reaction may release the halogenide back into the solution.

Many of the catalysts herein may form a coordination bond with graphitic materials. The bonding can assist the solubilization of the graphitic material. The solubilization can promote the reaction.

The reactions can be further assisted by adding other molecules that solubilize CNTs. Cellulose and cellulose derivatives, such as acetyl cellulose and carboxymethyl cellulose, may be used.

Figure 4:
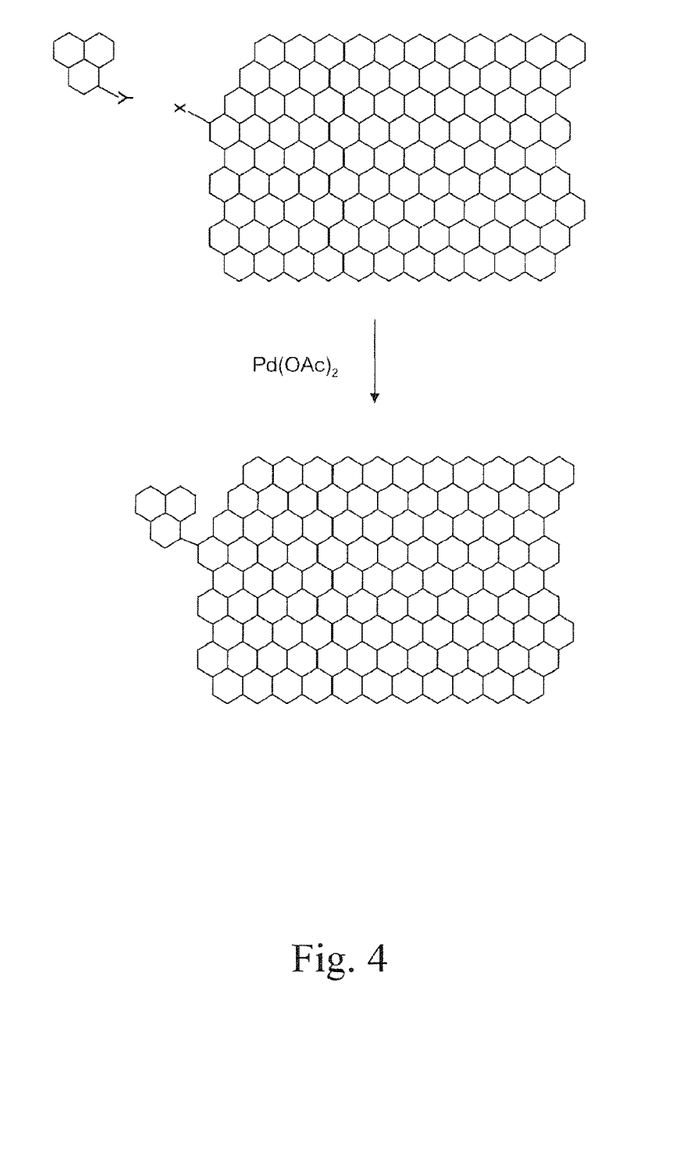
FIG. 4 schematically illustrates what is disclosed herein.

FIG. 4 may provide a simplified depiction of the binding of a reagent with a graphitic material through the use of a catalyst.

Within the description herein, also described is a functionalized graphitic material prepared by the method comprising the steps of: 1) providing the graphitic material; 2) cutting the graphitic material; 3) providing a catalyst comprising at least one catalyst of a metal atom, metal cation, metal alcoholates, metal alkanoates, metal sulfonates, and metal powder; 4) providing a reagent; 5) binding the catalyst to the reagent; 6) binding the reagent to the graphitic material; and 7) recovering the catalyst.

Within the process of chemically couple graphitic materials with polymers, which is described herein, graphitic materials and other components, such as monomers or polymers, may often be transiently functionalized with halogens, sulfonates, or other functional groups, such as dimethylboron before actual coupling. The overall yield may be low, but can be sufficient.

The composition and methods described herein as to the functionalized CNTs, the materials and methods can be used to reinforce materials, such as thermoplastics, thermoset resins, rubber, metals, and concrete.

EXPERIMENTAL DETAILS

While this invention has been described in detail with reference to certain examples and illustrations of the invention, it should be appreciated that the present invention is not limited to the precise examples. Rather, in view of the present disclosure, many modifications and variations would present themselves to those skilled in the art without departing from the scope and spirit of this invention. The examples provided are set forth to aid in an understanding of the invention but are not intended to, and should not be construed to limit in any way the present invention.

Example 1

Approximately 20 mg of multiwalled CNTs was sonicated in 20 ml of a solvent for about 2 minutes. Then, 5 mg of aluminum isopropoxide was added, except in reference experiments. Power was 400 W and cycle time was 50% (i.e. sonication was on 1 s and off 1 s, etc.). Approximately 100 mg of 1,4-diaminobutane was added, and the mixture was sonicated similarly for about 30 minutes under nitrogen atmosphere. The mixture was filtered using filter paper, and washed twice with 20 ml of 2-propanol. The product was dried in air, and suspended into 20 ml of 2-propanol by sonication for about 2 minutes. Fluorescein isothiocyanate solution in 2-propanol (4 ml containing 0.5 mg of FITC/ml) was added and the mixture was sonicated about 10 minutes. Then, 2 ml of this solution was centrifuged for about 20 minutes at about 14,000 rpm, and the precipitate was washed three times with 2 ml of 2-propanol, and suspended into 40 ml of 2-propanol by sonication about 10 minutes. This suspension was diluted with equal amount of PBS. Fluorescence was measured at 520 nm, while excitation wavelength was 490 nm. Fluorescence intensities were as follows:

| Solvent | Reference | With Al(2-PrO)$_3$ |
|---|---|---|
| 2-propanol | 8 | 122 |
| Tetrahydrofuran | 480 | 640 |

Example 2

First, 20 mg of multiwalled CNTs was sonicated in 20 ml of a solvent for about 2 minutes. Second, 20 mg of aluminum tosylate was added, except in reference experiments. Power was 400 W and cycle time was 50% (i.e. sonication was on 1 s and off 1 s, etc.). About 100 mg of bisepoxy bisphenol A was added, and the mixture was sonicated similarly about 30 minutes under nitrogen atmosphere. The mixture was filtered using filter paper, and washed twice with 20 ml of 2-propanol. The product was dried in air, and suspended into 20 ml of 2-propanol by sonication for about 2 minutes. Next, 20 mg of 1,4-diaminobutane was added and the mixture was heated at about 80° C. for about 2 hours. The mixture was filtered through a filter paper and washed twice with 20 ml of 2-propanol, and the precipitate was suspended into 20 ml of 2-propanol by sonication for about 2 minutes. Fluorescein isothiocyanate solution in 2-propanol (4 ml containing 0.5 mg of FITC/ml) was added and the mixture was sonicated for about 10 minutes. About 2 ml of this solution was centrifuged for about 20 minutes at 14,000 rpm, and the precipitate was washed three times with 2 ml of 2-propanol, and suspended into 40 ml of 2-propanol by sonication for about 10 minutes. This suspension was diluted with equal amount of PBS. Fluorescence was measured at 520 nm, while excitation wavelength was 490 nm.

| Solvent | Reference | With Al(OTs)$_3$ |
|---|---|---|
| 2-propanol | 4 | 48 |
| Tetrahydrofuran | 142 | 220 |

Example 3

Ten liters of CA 35 (Jeffamine, Huntsman) was mixed with 100 g of multiwalled CNTs (Bayer, Germany), 50 g of aluminium isopropoxide and 10 g of silica nanoparticles (Aldrich). The mixture was stirred by a blade mixer for about 6 hours. The suspended mixture was processed with DeBEE 2000 Pilot Homogenizer. Flow rate was about 500 ml/min and pressure at about 1,500,000 mmHg (2000 bar). Product was mixed in aliquots with equivalent amount of bisglycidyl ether of bisphenol A, and 180 g of benzoic acid.

Example 4

One gram of single walled CNTs and one gram of trimethylborate were sonicated in 100 ml tetrahydrofuran 30 minutes. A mixture of palladium acetate and bromopyrene in 50 ml of tetrahyrodrofurane were added, and sonication was continued another 30 minutes. The mixture was filtered through quantitative filter paper, and washed with tetrahydrofuran. Fluorescence spectrum was measured with excitation at 345 nm. Emission at 395 nm indicated the bound pyrene.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method of functionalizing graphitic material, consisting of the steps of:
   providing a graphitic material, wherein the graphitic material is selected from the group consisting of carbon nanotubes and graphene, with no prior chemical reactions;
   providing a catalyst comprising at least one catalyst of a Friedel-Craftes catalyst, a Sandmayer catalyst, a Heck catalyst, and a Suzuki type catalyst;
   providing a reagent;
   mixing the graphitic material, the catalyst, and the reagent together;
   cutting said graphitic material, wherein said cutting occurs after mixing the graphitic material, the catalyst, and the reagent together;
   prior to cutting said graphitic material, binding said catalyst to said reagent; and
   binding said reagent to said graphitic material during cutting, wherein the functionalization occurs during cutting.

2. The method of claim 1, wherein said cutting comprises at least one cutting of ultrasonic vibrators, sonotrode, electromagnetic radiation, mechanical cutting, and shear force.

3. The method of claim 1, wherein said Sandmayer catalyst is selected from the group consisting of aluminum bromide, cuprous chloride, and combinations thereof, said Friedel-Crafts catalyst is selected from the group consisting of aluminum chloride, ferric chloride, zinc chloride, tin chloride, and combinations thereof, said Suzuki catalyst is selected from the group consisting of palladium, palladium acetate, and combinations thereof, and said Heck catalyst is selected from the group consisting of palladium, palladium acetate, and combinations thereof.

4. The method of claim 1, wherein said reagent comprises at least one reagent of an amino group and an epoxy group.

5. The method of claim 1, wherein said reagent comprises at least one reagent of alkyl halogenides, aryl halogenides, acyl halogenides, tosylates, triflates, and thiols.

6. The method of claim 2, wherein cutting said gaphitic material comprises:
   using an ultrasonic vibrator to cut said graphitic material, wherein the cutting is done in the presence of an amine hardener.

7. The method of claim 6, wherein the ultrasonic vibrator is made of piezoelectric material between two electrodes, wherein the ultrasonic vibrator has a frequency range of 10 kHz to 1 MHz and a vibration amplitude of about 5 micrometers to about 200 micrometers.

8. The method of claim 4, wherein binding said catalyst to said reagent comprises:
   the epoxy binds to said catalyst and undergoes a ring opening; and
   the ring-opened epoxy is bound to said graphitic material.

9. The method of claim 2, wherein cutting said graphitic material comprises:
   milling and grinding said graphitic material in the presence of sharp edged microparticles and shard edged nanopartielcs, wherein the microparticles and nanoparticles are chosen from the following: sodium chloride, sodium cyanide, calcium oxalate, glass, quartz, aluminum oxide, and zirconium oxide.

10. The method of claim 2, wherein cutting said graphitic material comprises:
    utilizing shear force to cut said gaphitic material, wherein the shear force has pressures between about 375,000 mmHg and about 2,250,000 mmHg.

11. The method of claim 10, wherein the shear force is provided by high pressure microfluidic injection of a reagent mixture through a nozzle.

12. A method of functionalizing graphitic material, consisting of the steps of:
    providing a graphitic material, wherein the graphitic material is selected from the group consisting of carbon nanotubes and graphene, with no prior chemical reactions;
    providing a catalyst comprising at least one catalyst of a Friedel-Crafts catalyst, a Sandmayer catalyst, a Heck catalyst, and a Suzuki type catalyst;
    providing a reagent;
    mixing the graphitic material, the catalyst, and the reagent together;
    cutting the graphitic material, wherein said cutting occurs after mixing the graphitic material, the catalyst, and the reagent together;
    binding the catalyst to the graphitic material; and
    binding the reagent to the graphitic material during cutting, wherein the fonctionalization occurs during dispersion of the graphitic material.

13. The method of claim 1, wherein the graphitic material is a carbon nanotube.

14. The method of claim 1, wherein the graphitic material is graphene.

15. The method of claim 1, wherein the cut graphitic material has free electrons and the catalyst stabilizes the graphitic material.

16. The method of claim 1, wherein the functionalization of the graphitic material creates a direct carbon-carbon bond.

* * * * *

UNITED STATES PATENT AND TRADEMARK OFFICE
CERTIFICATE OF CORRECTION

PATENT NO. : 9,764,957 B2
APPLICATION NO. : 14/768406
DATED : September 19, 2017
INVENTOR(S) : Jorma Virtanen It is certified that error appears in the above-identified patent and that said Letters Patent is hereby corrected as shown below:

In the Claims

Column 8, Line 32 of Claim 1 "Friedel-Craftes" should be "Friedel-Crafts"
Column 8, Line 63 of Claim 6 "gaphitic" should be "graphitic"
Column 9, Line 15 of Claim 9 "nanopartielcs" should be "nanoparticles"
Column 9, Line 21 of Claim 10 "gaphitic" should be "graphitic"
Column 10, Line 17 of Claim 12 "fonctionalization" should be "functionalization"

Signed and Sealed this
Twenty-eighth Day of April, 2020

Andrei Iancu
*Director of the United States Patent and Trademark Office*